UNITED STATES PATENT OFFICE.

RICHARD SIMPSON, ARTHUR BROOKE, AND THOMAS ROYLE, OF HARROW, ENGLAND.

IMPROVEMENT IN PREPARATION OF ALIZARINE, &c., MADE FROM ANTHRACENE.

Specification forming part of Letters Patent No. 182,234, dated September 12, 1876; application filed June 16, 1876.

*To all whom it may concern:*

Be it known that we, RICHARD SIMPSON, ARTHUR BROOKE, and THOMAS ROYLE, all of Greenford Green Alizarine Works, Harrow, in the county of Middlesex, England, have invented new and useful Improvements in Prepared Alizarine and other analogous coloring matters made from anthracene, and in the preparation thereof, which improvements are fully set forth in the following specification.

This invention has for its object improvements in the preparation of alizarine and other analogous coloring matters made from anthracene, and in the prepared colors.

Such coloring matters—purple alizarine, blue alizarine, red or scarlet alizarine, or anthrapurpurine—are at the present time sent into the market in a wet or pasty state, and heretofore all attempts to use them in a dry state have been unsuccessful, in consequence of the difficulty which is experienced, after the color has been dried, of diffusing it in the dye-bath, so that the coloring matter may be taken up by the mordant on the fabric immersed in the bath. These difficulties we have overcome, and we are able to produce such colors in the form of a powder, which can be put directly into the dye-bath, and is then, without any special manipulation, at once ready for use.

We proceed as follows: We take twenty parts of hydrate of lime and mix it with sufficient water to form a paste. We then add eight hundred parts of the coloring matter in the pasty form, the paste containing ten per cent. of color; or we use a corresponding quantity of a paste of another percentage. We well mix the whole, and then place the mixture in a drying-room, or otherwise dry it at a temperature not exceeding 212° Fahrenheit. When sufficiently dry, we pass the compound through a sieve, and it then forms a powder, ready for use, as already explained. Or a similar result may be obtained from the "soda-melt," as it is called, where, in the process of manufacture of the coloring matter, the coloring principle is obtained in solution in soda. If lime-water be added to the soda-melt in the proportion of one hundred parts of lime-water to five parts of the soda-melt, (alizarate or anthrapurpurate of soda,) a precipitate is obtained, which we collect in a filter, and dry, as already described. The precipitate, when dry, forms a powder suitable for the dye-bath. This powder does not differ from that obtained by the means first described, which means are the more convenient.

We claim—

1. Alizarine and other analogous coloring matter made from anthracene, in the form of dry powder, substantially as set forth.

2. The hereinbefore-described method of preparing alizarine and other analogous coloring matter from anthracene, which consists in mixing hydrate of lime and water, adding thereto the coloring matter, mixing the whole together, drying the mixture, and finally passing it through a sieve, substantially as set forth.

RICH. SIMPSON.
ARTHUR BROOKE.
THOMAS ROYLE.

Witnesses:
W. J. WARREN,
WILMER M. HARRIS,
*Both of No. 17 Gracechurch street, London.*